United States Patent Office 3,272,613
Patented Sept. 13, 1966

3,272,613
WEED OIL-FERTILIZER COMPOSITION
Donald C. Young, Fullerton, Calif., assignor to Union Oil Company of California, Los Angeles, Calif., a corporation of California
No Drawing. Filed Sept. 4, 1962, Ser. No. 221,350
7 Claims. (Cl. 71—2.3)

This invention relates to liquids comprising a hydrocarbon oil emulsified in ammonium salt solutions, to an emulsifiable concentrate comprising said oil, emulsifier and water and to methods for preparing said emulsion and said emulsifiable concentrate.

In recent years, petroleum stocks have been sprayed over weed growth in orchards and citrus groves to check the growth of weeds. This practice checks weed growth while resulting in better water penetration and less erosion of soil than encountered with cultivation. A substantial reduction in time and expense of this application could be effected if the weed spraying were combined with fertilization of the orchard or citrus grove by emulsifying the weed oil in a fertilizer solution. Unfortunately, ammonium salt solutions—the commonly employed fertilizers—are liquids which are extremely resistant to emulsification.

It is an object of this invention to provide a stable emulsion of a hydrocarbon oil in ammonium salt solutions.

It is also an object to provide an emulsifiable oil composition which will spontaneously emulsify in ammonium salt solutions.

I have found that hydrocarbons can be stably emulsified in ammonium salt solutions with an emulsifier comprising an amine salt of a sulfo-dicarboxylic acid ester of polyoxyethylated alkylphenols. In general, chemicals having the following structure are suitable as the emulsifier:

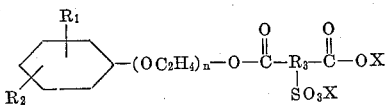

wherein:
$R_1$ is selected from the class consisting of alkyl and alkenyl groups;
$R_2$ is selected from the class consisting of hydrogen, alkyl and alkenyl group;
$R_3$ is selected from the group consisting of divalent sulfo-alkylene and sulfo-alkenylene groups;
$X$ is an organic amine cation;
$n$ is an integer between about 2 and about 5; and the total of carbons in any $R_1$, $R_2$ or $R_3$ group is less than about 12; and preferably less than about 6.

Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for $X$ such as the primary, secondary and tertiary alkyl, alkenyl and aryl amines as well as heterocyclic compounds containing a basic nitrogen. Examples of suitable amines are the following: methylamine, dimethylamine, ethylamine, triethylamine, diethyl benzyl amine, propylamine, isopropylamine, diisopropylamine, ethylpropylamine, butylamine, isobutylamine, diisoamylamine, hexylamine, heptylamine, isooctylamine, furanamine, benzylamine, morpholine, pyridine, etc. Preferred are the alkylamines having between 1 and about 6 carbons, e.g., isopropylamine.

Examples of various compounds useful as emulsifiers in my invention are the following: half isobutyl amine salt, half tetraethoxy xylenol ester of sulfo-gluteric acid; half isopropyl amine salt, half triethoxy amyl phenol ester of sulfo-adipic acid; half amyl amine salt, half pentaethoxy cresol ester of sulfo-pimelic acid; half hexylamine salt, half diethoxyoctyl phenol ester of sulfo-suberic acid; half isopropylamine salt, half diethoxy dodecyl phenol ester of sulfo-azelaic acid; half heptylamine salt, half diethoxy dodecyl phenol ester of sulfo-sebacic acid, etc.

Of the aforedescribed emulsifier compounds, the most preferred are those in which the total of carbons in any $R_1$, $R_2$ or $R_3$ group is less than 4 and the number of carbons in the $R_3$ group is 2 or 3. In this most preferred group, $n$ preferably equals two.

The ammonium salt solutions which are used as the liquid medium in which the hydrocarbon oil is emulsified are, in general, the conventional liquid fertilizer solutions such as aqua ammonia, ammonium nitrate, monoammonium phosphate, diammonium phosphate, ammonium sulfate, ammonium sulfide, ammonium chloride and mixtures thereof. In general, aqueous solutions of the aforementioned solutes are used having at least about 5 weight percent of solute. Preferably, the emulsion is formed with more concentrated solutions, e.g., those having salting out temperatures at or about 0° C. Typically, the following concentrations can be used; aqua ammonia, "20–0–0"; ammonium nitrate, "20–0–0"; ammonium phosphate, "8–24–0"; and ammonium sulfate, "10–0–0."

Various hydrocarbon oils can be used as the herbicide such as virgin and converted crude oil distillates and residues, e.g., stove oils, fuel oils, gas oils, diesel oils, aromatic extracts and acid sludges from refined distillates, etc. A class of materials readily available and having a preferably high concentration of aromatics comprises the various petroleum residues from crude distillation and thermal and catalytic cracking. Aromatic stocks boiling between about 250° and 550° F. are preferred because of their apparent high toxicity. Examples of aromatic types are benzene, alkylbenzenes having one, two or three alkyl side chains, each having from 1 to 20 carbons. Naphthalene, methylnaphthalenes, dimethylnaphthalenes, ethylnaphthalenes, diethylnaphthalenes, decahydronaphthalene, tetrahydronaphtalene, anthracene, alkyl anthracenes, phenanthrene, pyrene, etc.

If desired, the toxicity of the hydrocarbon can be fortified by the addition of various toxic compounds such as dinitrobutyl phenol, dinitroamyl phenol, pentachlorophenol or commonly used broad leaf herbicides such as 2-4, dichlorophenoxyacetic acid, salts and alkanol esters thereof to the emulsion in amounts comprising from about 2 to about 50 weight percent of the total organic content of the emulsion; although amounts from about 2 to 15 percent of the organic content would be most useful.

The amount of hydrocarbon in the fertilizer emulsion can be widely varied, as desired, from about 10 to about 50 weight percent of the emulsion. The amount so employed will depend largely on the relative rates of application desired. In general, 20 to 80 pounds of oil per acre per year will provide adequate weed control; however, the first year of use as much as 300 pounds per acre may be required, this amount to be applied in two or more applications.

The degree of fertilization varies with the crops; however, generally about 50 and about 200 pounds of nitrogen per acre are required for most crops and citrus. Preferably between about 15 and 200 pounds of phosphorus (as $P_2O_5$) and/or sulfur are also applied. The aforementioned blend of hydrocarbon and fertilizer will adequately satisfy these requirements; preferably, however, emulsions containing between about 30 and about 45 weight percent of a hydrocarbon oil are employed.

The balance of the emulsion comprises the aforementioned aqueous ammonium salt solution and sufficient of the aforementioned emulsifiers to form a stable emulsion. In general, the emulsifier is employed in amounts comprising between about 1 and 25 weight percent of the hydrocarbon; preferably in amounts between about 5 and 20 weight percent.

The aforementioned emulsifiable concentrate comprises between about 5 and about 50 weight percent of water, between about 49 and about 94 weight percent of a hydrocarbon oil and between about .5 and about 19 weight percent of an emulsifier. Preferably, to avoid excessive dilutions, the water content of the concentrate is maintained at a minimum value and is between about 5 and about 25 weight percent.

The hydrocarbon oil and emulsifier can be readily emulsified in the ammonium salt solution by stirring in a mix tank the amounts previously indicated. The order of mixing the components is not material, although it is preferred to have the emulsifier present when the oil and ammonium salt solution are mixed.

Simple mixing of water, oil and emulsifier, however, is not sufficient to form the emulsifiable concentrate of my invention. I have found that an apparent electrostatic charge accumulates on the separate phases during mixing and this charge does not dissipate during normal mixing. The emulsifiable concentrate, therefore, must be stirred under conditions to dissipate the apparent electrostatic charge which prevents thorough dispersion of the liquids. The electrostatic charge can, of course, be removed by applying a voltage to the liquid mixture, e.g., by immersing electrodes into the mix tank. Preferably, however, intermittent mixing is performed in an electrically grounded tank. The tank contents are stirred for a period of 2 to 15 minutes, agitation is discontinued for 2 to 15 minutes, then again applied for 2 to 15 minutes. Repetition of this agitation for 2 to about 5 cycles will generally cause complete emulsification whereas several hours of continuous agitation will fail to achieve emulsification.

The following compositions are illustrative of hydrocarbon oil-fertilizer compositions within the scope of my invention:

COMPOSITION 1

Ingredient: Parts by weight
- Diesel oil _____ 10
- Half isopropyl amine salt, half triethoxycresol ester of sulfo-malonic acid _____ 1
- "8-24-0" ammonium phosphate solution _____ 89

COMPOSITION 2

- Aromatic distillate, 300–450° F. boiling range __ 35
- Half ethyl amine salt, half diethoxy (o-cumenol) ester of sulfo-succinic acid _____ 4
- "20-0-0" ammonium nitrate solution _____ 61

COMPOSITION 3

- Residual fuel oil _____ 50
- Half amyl amine, half tetraethoxy xylenol ester of sulfo-gluteric acid _____ 10
- "10-0-0" ammonium sulfate solution _____ 40

COMPOSITION 4

- Aromatic lube oil extract _____ 30
- Half heptyl amine salt, half diethoxydodecyl phenol ester of sulfo-sebacic acid _____ 6
- "20-0-0" ammonium nitrate _____ 64

COMPOSITION 5

- Dimethylnaphthalene (mixture of 2,6 and 2,7) __ 25
- Half isopropylamine, half triethoxy amyl phenol ether of sulfo-adipic acid _____ 1
- "9-0-0-10" ammonium sulfate _____ 74

COMPOSITION 6

- Aromatic gas oil (500–850° F. boiling point) __ 40
- Half diisopropyl amine salt, half diethoxy cresol ether of sulfo-pimelic acid _____ 81
- "20-0-0" ammonium nitrate _____ 20
- "8-24-0" ammonium phosphate _____ 32

*Example 1*

A commercial weed oil, Union Oil Company of California, Solvent 4276, having a boiling point range of about 420° to about 760° F. and comprising chiefly a catalytically cracked light cycle oil, was emulsified at several concentrations in ammonium nitrate with varied amounts of an emulsifier. In the first series of experiments, the half amine salt, half polyethoxy alkyl phenol ether of a sulfo-dicarboxylic acid was employed as the emulsifier. The following table summarizes the results:

TABLE 1

| Sample | Weight Ratio | | Volume, ml. | | Emulsifier Wt. percent of Oil | Separation [1] | | | | | | | | |
|---|---|---|---|---|---|---|---|---|---|---|---|---|---|---|
| | | | | | | One Hour | | | 20 Hours | | | 4 Days | | |
| | Oil | Ammonium Nitrate | Oil | Ammonium Nitrate | | O | C | A | O | C | A | O | C | A |
| 1 | 50 | 25 | 119 | 81 | 1.0 | 68 | 13 | 119 | 79 | 1 | 120 | 80 | 1 | 120 |
| 2 | 50 | 25 | 119 | 81 | 5.0 | 1 | 170 | 31 | 2 | 96 | 104 | 3 | 86 | 113 |
| 3 | 50 | 25 | 119 | 81 | 10.0 | ----- | 176 | 31 | 2 | 98 | 107 | 3 | 86 | 118 |
| 4 | 50 | 25 | 119 | 81 | 20.0 | ----- | 187 | 27 | 1 | 108 | 105 | 2 | 92 | 120 |
| 5 | 50 | 25 | 119 | 81 | 25.0 | ----- | 198 | 18 | [2] Tr | 121 | 95 | 4 | 98 | 114 |
| 6 | 50 | 35 | 104 | 100 | 1.0 | 1 | 174 | 31 | 10 | 100 | 96 | 100 | 4 | 102 |
| 7 | 50 | 35 | 104 | 100 | 5.0 | ----- | 192 | 17 | 2 | 121 | 86 | 2 | 109 | 98 |
| 8 | 50 | 35 | 104 | 100 | 10.0 | ----- | 195 | 16 | 1 | 126 | 84 | 2 | 112 | 97 |
| 9 | 50 | 35 | 104 | 100 | 20.0 | ----- | 213 | 9 | Tr | 151 | 71 | 2 | 128 | 92 |
| 10 | 50 | 35 | 104 | 100 | 25.0 | ----- | 221 | 5 | Tr | 166 | 60 | 4 | 134 | 88 |

[1] Separation reported as milliliters of oil layer (O), cream or emulsion layer (C) and aqueous layer (A).
[2] Tr is trace.

When the experiment is repeated with other types of emulsifiers including the following: Dupanol SN, sodium lauryl sulfate; Teigitol 4, 7-ethyl 2-methyl undecanol-4 sodium sulfate; Triton X-100, isooctyl phenol polyethoxy ethanol; Egepal 630, nonyl phenoxy polyoxyethylene oxide; Ultra-Wet 30DS, polyalkyl benzene sulfonate with an average $C_{10}$ alkyl group; no stable emulsion is formed.

The preceding examples are intended solely to illustrate my invention and are not to be construed as unduly limiting thereof, the scope of my invention being intended to be defined by the following claims.

I claim:

1. A concentrate spontaneously emulsifiable in concentrated aqueous ammonium salt solutions to provide weed oil-fertilizer compositions comprising between about 49 and 94 weight percent of a hydrocarbon oil, between about 5 and 50 weight percent water and between about 0.5 and 19 weight percent of an emulsifier characterized by the following:

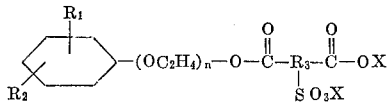

wherein:
$R_1$ is selected from the class consisting of alkyl and alkenyl groups;
$R_2$ is selected from the class consisting of hydrogen, alkyl and alkenyl groups;
$R_3$ is selected from the group consisting of trivalent sulfo-alkylene and sulfo-alkenylene;
X is an organic amine cation having from 1 to about 6 carbon atoms;
$n$ is an integer between about 2 and about 5;
and the total of carbons in each of $R_1$, $R_2$, $R_3$ groups is less than about 12.

2. The composition of claim 1 wherein the total of carbons in each of said $R_1$, $R_2$ and $R_3$ groups is less than about 6.

3. The composition of claim 1 wherein the total of carbons in each of said $R_1$, $R_2$ and $R_3$ groups is less than about 4 and $n$ equals two.

4. A weed oil-fertilizer composition comprising an emulsion of between about 10 and about 50 weight percent of a hydrocarbon oil emulsified in an aqueous ammonium salt solution with an emulsifier in an amount comprising between about 5 and about 20 weight percent of said hydrocarbon, said emulsifier characterized by the following:

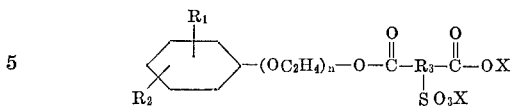

wherein:
$R_1$ is selected from the class consisting of alkyl and alkenyl groups;
$R_2$ is selected from the class consisting of hydrogen, alkyl and alkenyl groups;
$R_3$ is selected from the group consisting of trivalent sulfo-alkylene and sulfo-alkenylene;
X is an organic amine cation having from 1 to about 6 carbon atoms;
$n$ is an integer between about 2 and about 5;
and the total of carbons in each of $R_1$, $R_2$, $R_3$ groups is less than about 12.

5. The composition of claim 4 wherein said ammonium salt solution is ammonium nitrate.

6. The composition of claim 4 wherein the total of carbons in each of said $R_1$, $R_2$ and $R_3$ groups is less than about 4 and $n$ equals 2.

7. The composition of claim 4 wherein said aqueous ammonium salt solution is saturated with said ammonium salt at a temperature of about 0° C.

References Cited by the Examiner
UNITED STATES PATENTS

| | | | |
|---|---|---|---|
| 2,898,267 | 8/1959 | Lindner | 167—42 |
| 2,976,209 | 3/1961 | Lindner | 167—42 |
| 2,976,211 | 3/1961 | Lindner | 71—2.3 |
| 3,080,280 | 3/1963 | Lindner | 71—2.3 |

DONALL H. SYLVESTER, *Primary Examiner.*

ANTHONY SCIAMANNA, H. R. CAINE, *Examiners.*